Patented July 17, 1923.

1,462,093

UNITED STATES PATENT OFFICE.

CHARLES E. WALLER, OF ALLENTOWN, PENNSYLVANIA, ASSIGNOR TO TROJAN POWDER COMPANY, OF NEW YORK, N. Y., A CORPORATION OF NEW YORK.

DETONATOR COMPOSITION.

No Drawing. Application filed May 13, 1921, Serial No. 469,193. Renewed April 4, 1923.

*To all whom it may concern:*

Be it known that I, CHARLES E. WALLER, a citizen of the United States, and resident of Allentown, Lehigh County, Pennsylvania, have invented certain Improvements in Detonator Compositions, of which the following is a specification.

My invention relates to primer compositions for use in detonators, and its object is to produce a nitro-starch composition, suitable for use as the main charge of a detonating cap or electric detonator, and capable of use in a detonator loading machine of the type ordinarily used in the loading of mercury fulminate detonators.

To be used in any of the standard types of loading devices employed in detonator manufacture, an explosive composition must be relatively free-flowing, and this characteristic is not possessed by nitro-starch composition in which the starch granules have an average diameter of less than .045 mm. I have discovered, however, that while all starch exists in the form of minute granules, the different starch granules differ in size and in physical roughness of surface, and further that the starches which have an average diameter in excess of .045 mm. possess such weight per unit granule that the skin friction caused by the contact of individual granules is not sufficient to prevent the flowage of the material into the loading cavities of the charging block of a standard loading machine, such as heretofore mentioned, and therefore such starch when nitrated can be satisfactorily used as the base for an explosive which can be loaded by means of the standard machines.

The average size of the granules of wheat starch is about .025 mm., of corn starch is about .020 mm., of rice starch is about .005 mm., of potato starch is about .050 mm., and of tous-les-mois is about .065 mm. From this it will be seen that of all these starches potato and tous-les-mois starches possess sufficiently large granules to answer the requirements necessary to insure a suitable degree of free-flowing. Tous-les-mois starch is relatively rare, and at present does not enter the commercial markets, and accordingly potato starch is the principal commercial product which possesses the required characteristics.

In practicing my present invention, I prefer to add to my nitrostarch certain oxidizing and stabilizing agents to make my finished detonator composition. I find, for example, that a charging composition composed of 80% of nitrated potato starch, 5% of diphenylamine and 15% of potassium chlorate forms a satisfactory composition. In preparing a detonator composition containing the ingredients just mentioned, a convenient procedure is as follows:

I first nitrate potato starch in the usual manner. 80 parts of the carefully dried nitrated potato starch is next thoroughly mixed with 15 parts of a pulverized oxidizing agent, such for example as potassium chlorate, potassium perchlorate, ammonium perchlorate, or like material. The oxidizing agent should preferably be pulverized until it will pass through a sieve having openings .17 mm. square (80 mesh to the inch). 5 parts of finely pulverized purified diphenylamine is next added, and the composition is then thoroughly mixed until entirely homogeneous.

Instead of diphenylamine I may use any other suitable stabilizing agent, such for example as urea or a substituted urea, or urethane or a substituted urethane.

The nitro-starch composition prepared as described is utilized as the secondary charge in a reenforced detonator of the usual type, the primary charge being a suitable amount of mercury fulminate, or a mixture of mercury fulminate and potassium chlorate, or of any other suitable initial detonating agent.

While in illustrating my invention or discovery, I have described a specific composition, I do not wish to be limited to that, as in its broader aspect the essential feature of my invention is the employment in a primer composition of nitro-starch granules, of which the average size is larger than .045 mm., and I am the first, so far as I am aware, to discover the properties possessed by such granules, as hereinabove described, which permits their use for the purpose set forth.

I claim:

1. A primer composition comprising nitrostarch in granules of an average size in excess of .045 mm.

2. A primer composition comprising an oxidizing agent and nitrostarch in granules of an average size in excess of .045 mm.

3. A primer composition comprising an oxidizing agent, a stabilizing agent, and nitrostarch in granules of an average size in excess of .045 mm.

4. A primer composition for detonators comprising nitrated potato starch.

5. A detonator comprising an initial detonating charge and a secondary detonating charge comprising nitrostarch in granules of an average size in excess of .045 mm.

6. A detonator comprising an initial detonating charge and a secondary detonating charge comprising an oxidizing agent, a stabilizing agent, and nitrostarch in granules of an average size in excess of .045 mm.

7. A detonator comprising an initial detonating charge and a secondary detonating charge comprising nitrated potato starch.

CHARLES E. WALLER.